(12) United States Patent
Stroyer

(10) Patent No.: US 11,965,302 B2
(45) Date of Patent: Apr. 23, 2024

(54) WIND TURBINE FOUNDATION BASE

(71) Applicant: Benjamin G. Stroyer, East Rochester, NY (US)

(72) Inventor: Benjamin G. Stroyer, East Rochester, NY (US)

( * ) Notice: Subject to any disclaimer, the term of this patent is extended or adjusted under 35 U.S.C. 154(b) by 0 days.

(21) Appl. No.: 17/685,502

(22) Filed: Mar. 3, 2022

(65) Prior Publication Data
US 2022/0333333 A1    Oct. 20, 2022

Related U.S. Application Data

(60) Provisional application No. 63/156,035, filed on Mar. 3, 2021.

(51) Int. Cl.
| | | |
|---|---|---|
| E02D 27/42 | (2006.01) | |
| E02D 27/14 | (2006.01) | |
| F03D 13/20 | (2016.01) | |

(52) U.S. Cl.
CPC .......... *E02D 27/425* (2013.01); *E02D 27/14* (2013.01); *F03D 13/22* (2016.05)

(58) Field of Classification Search
CPC ........ E02D 27/425; E02D 27/14; F03D 13/22
See application file for complete search history.

(56) References Cited

U.S. PATENT DOCUMENTS

| | | | |
|---|---|---|---|
| 6,305,134 B1 * | 10/2001 | Robinson | ................ E02D 27/14 52/299 |
| 2016/0017630 A1 * | 1/2016 | Fairbairn | ............ E04H 12/2253 52/299 |
| 2017/0030045 A1 | 2/2017 | Krause et al. | |
| 2018/0073487 A1 | 3/2018 | Beramendi Ortega et al. | |
| 2018/0355851 A1 * | 12/2018 | Brohm | .................... F03D 13/22 |
| 2019/0055711 A1 | 2/2019 | Schuldt et al. | |
| 2020/0109699 A1 | 4/2020 | Kemp et al. | |

FOREIGN PATENT DOCUMENTS

WO    WO 00/46452    *    8/2000

OTHER PUBLICATIONS

International Search Report and Written Opinion for PCT/US2022/018615 dated Apr. 8, 2022.

* cited by examiner

*Primary Examiner* — Sean D Andrish
(74) *Attorney, Agent, or Firm* — Michael J. Nickerson; Dawson Law Firm, PC

(57) ABSTRACT

A wind turbine platform includes a wind turbine base; a plurality of radial moment beams, operatively connected to the wind turbine base, extending radially from the wind turbine base; and a plurality of piles, each pile being operatively connected to a radial moment beam and extending into a medium to provide foundational support for the wind turbine platform.

10 Claims, 12 Drawing Sheets

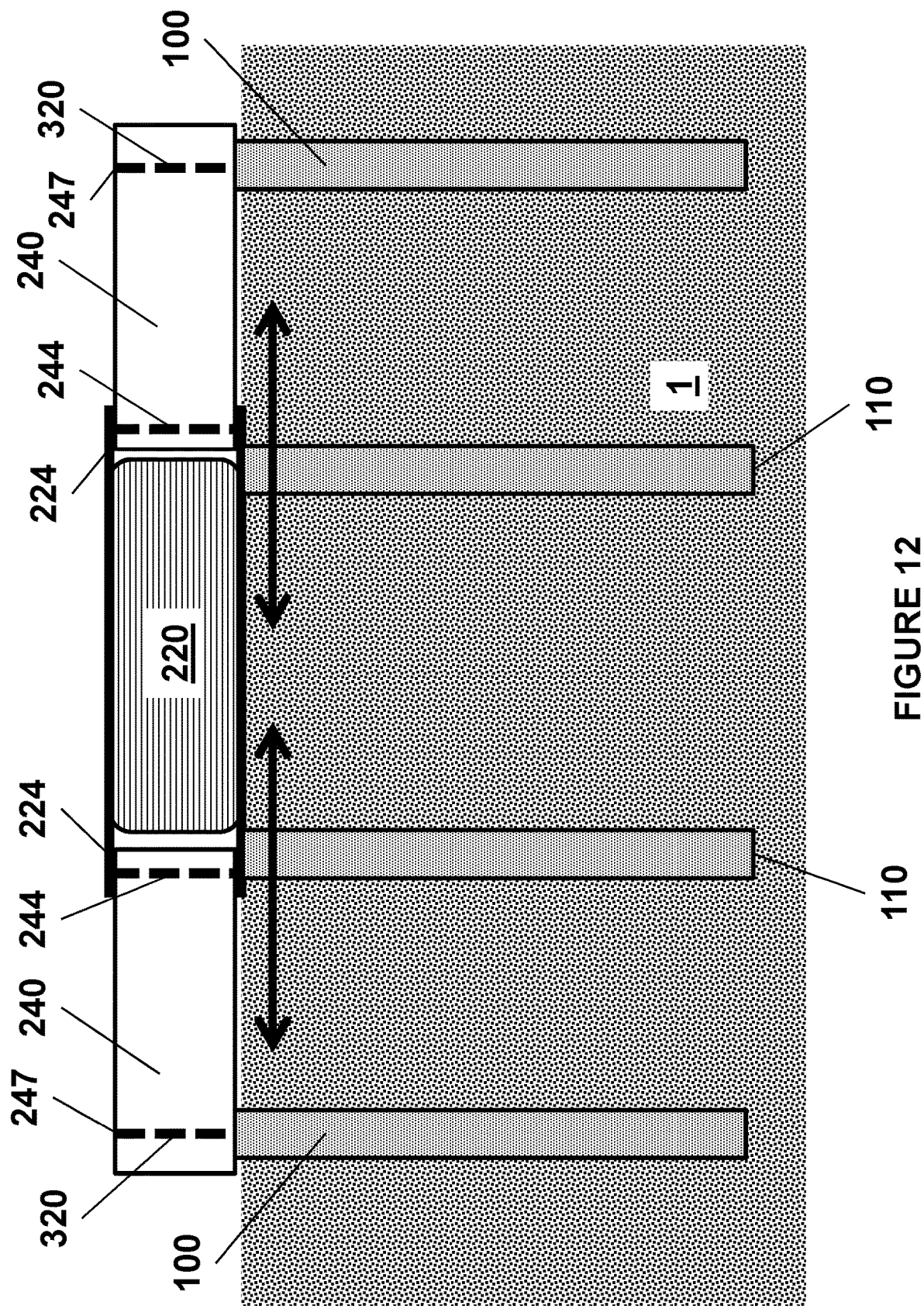

WIND TURBINE FOUNDATION BASE

PRIORITY INFORMATION

The present application claims priority, under 35 U.S.C. § 119(e), from U.S. Provisional Patent Application, Ser. No. 63/156,035, filed on Mar. 3, 2021. The entire content of U.S. Provisional Patent Application, Ser. No. 63/156,035, filed on Mar. 3, 2021, is hereby incorporated by reference.

BACKGROUND

Conventional wind turbine foundation bases are constructed of steel and require a large concrete footprint for stability. More specifically, to install a conventional wind turbine foundation base, the site requires excavation to prepare the site for the concrete base, which is constructed of a significant amount of concrete.

FIG. 1 illustrates a conventional wind turbine foundation base constructed on medium 1, such as soil. The conventional wind turbine foundation base includes a large concrete base (pad) 10, upon which a steel wind turbine platform 12 is placed. The steel wind turbine platform 12 includes attachment arms 14 for attaching the steel wind turbine platform 12 to the concrete base (pad) 10. The attachment arms 14 are connected (secured) to the concrete base (pad) 10, via attachment bolts (rivets) 16.

By utilizing the large concrete base 10 as the foundation for the steel wind turbine platform 12, the construction of the conventional wind turbine foundation base is a very disruptive process to the surrounding environment (excavation and large amounts of concrete).

FIG. 2 illustrates another perspective of a conventional wind turbine foundation base constructed in an excavated hole 11. The conventional wind turbine foundation base includes a large concrete base (pad) 10, upon which a steel wind turbine platform 12 is placed. The steel wind turbine platform 12 is attached to the concrete base (pad) 10.

By utilizing the large concrete base 10, located in a back-filled (not shown) excavated hole 11, as the foundation for the steel wind turbine platform 12, the construction of the conventional wind turbine foundation base is a very disruptive process to the surrounding environment (excavation and large amounts of concrete).

Moreover, the construction of the conventional wind turbine foundation base can take a significant amount of time due to the excavation requirement and the need for a large amount of concrete.

Lastly, the construction of the conventional wind turbine foundation base can be delayed due to weather due to the excavation requirement and the need for pouring a large concrete pad.

Therefore, it is desirable to provide a wind turbine platform that can be constructed with minimal disruption to the surrounding environment.

Also, it is desirable to provide a wind turbine platform that can be constructed in a minimal amount of time.

Furthermore, it is desirable to provide a wind turbine platform that can be constructed with minimal impact from weather.

Moreover, it is desirable to provide a wind turbine platform that can be constructed without the excavation requirements for constructing a concrete base (pad).

Also, it is desirable to provide a wind turbine platform that can be constructed without constructing a concrete base (pad).

Additionally, it is desirable to provide a wind turbine foundation base that utilizes a pre-fabricated wind turbine base.

Furthermore, it is desirable to provide a wind turbine platform that can be constructed using piles that are driven directly into a medium (soil) without constructing a concrete base (pad).

Moreover, it is desirable to provide a wind turbine platform that can be constructed using piles that are driven directly into a medium (soil).

Further, it is desirable to provide a wind turbine foundation base that can be easily assembled on-site.

Lastly, it is desirable to provide a wind turbine foundation base that can be easily dis-assembled on-site and be moved to another site or recycled.

BRIEF DESCRIPTION OF THE DRAWINGS

The drawings are only for purposes of illustrating various embodiments and are not to be construed as limiting, wherein:

FIG. 12 illustrates another embodiment of the wind turbine platform of FIG. 3 installed using piles to secure the wind turbine platform in place.

DETAILED DESCRIPTION

Figure 1:
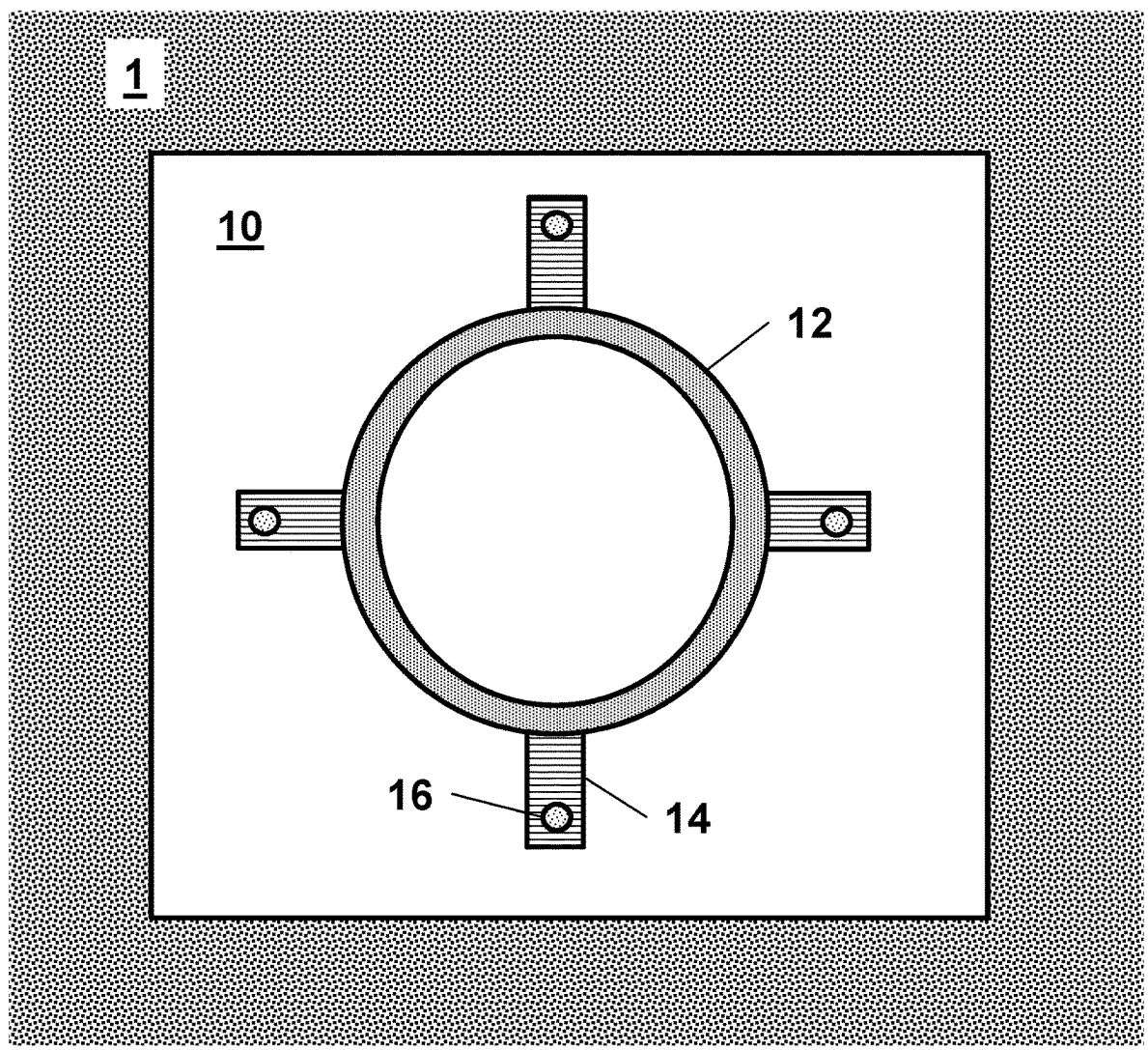
FIG. 1 illustrates prior art wind turbine foundation base.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
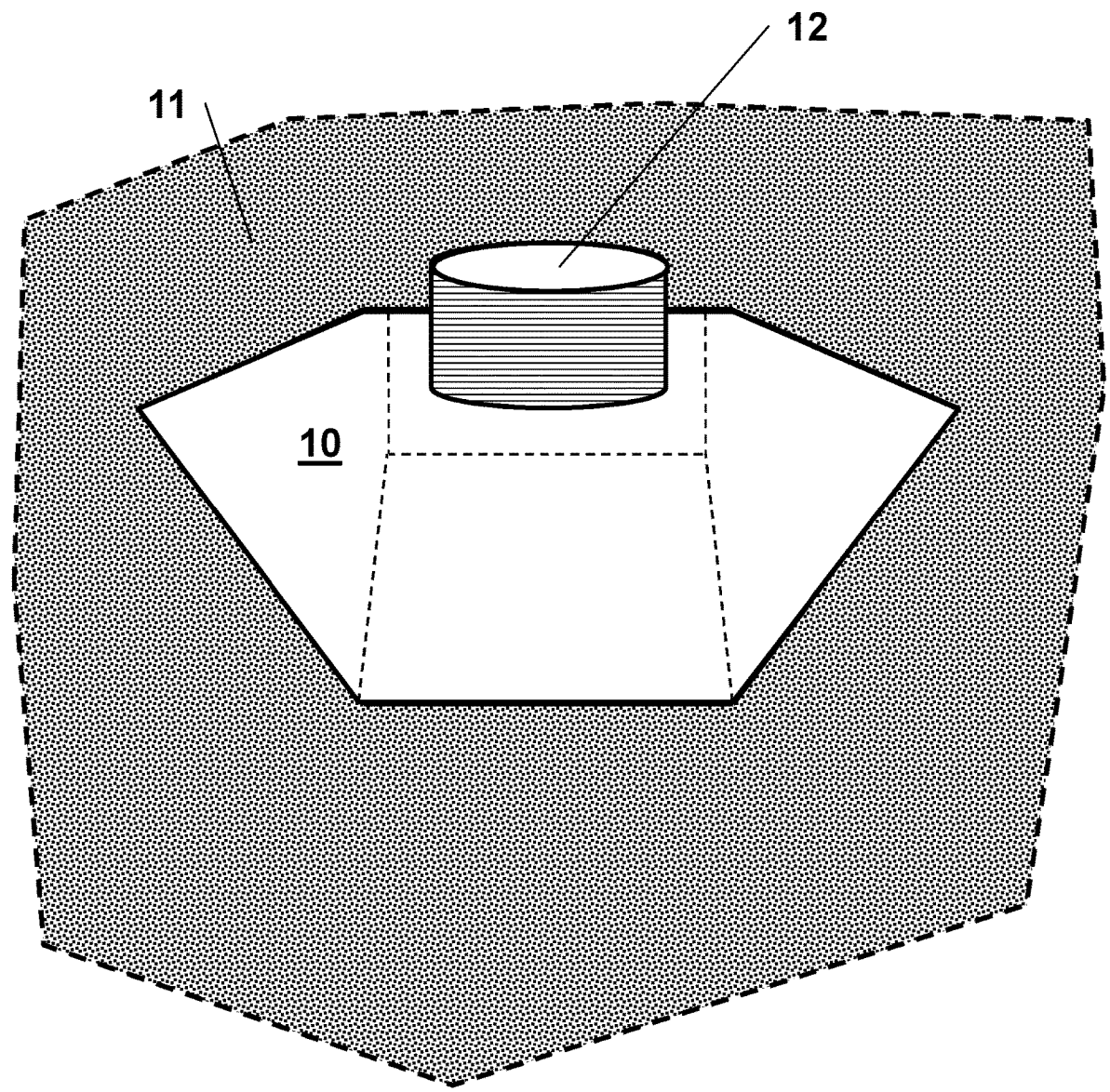
FIG. 2 illustrates another perspective of a prior art wind turbine foundation base.
Figure 3:
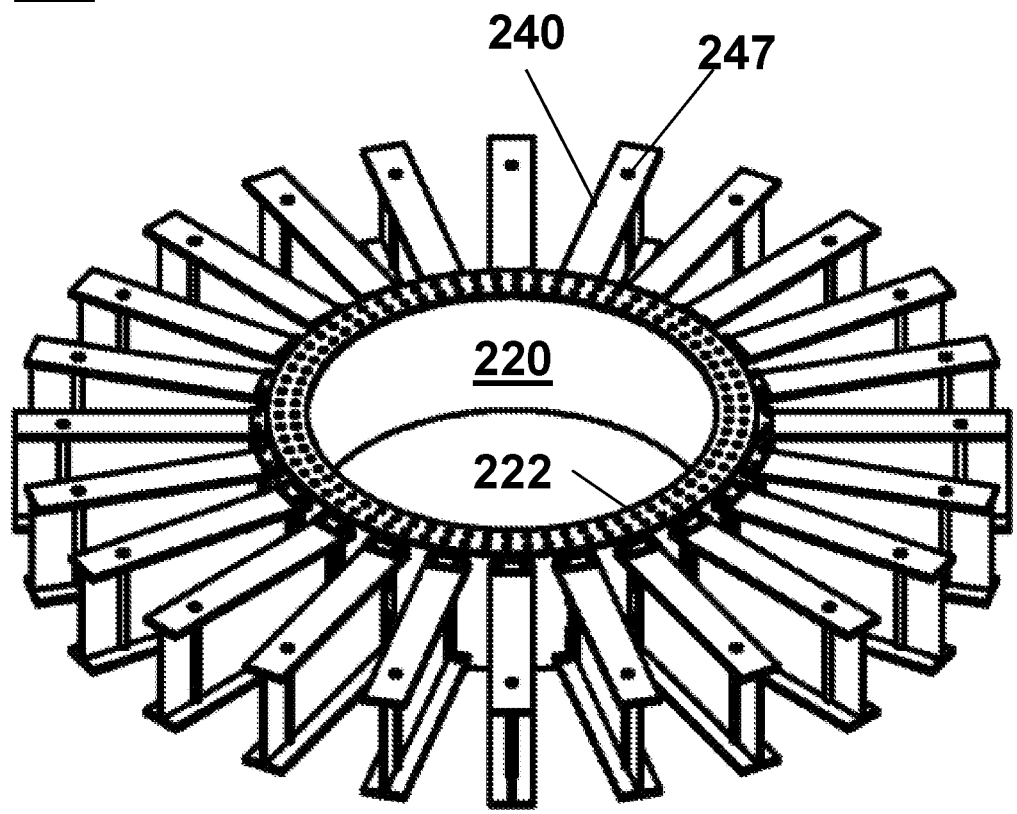
FIG. 3 illustrates a wind turbine base.

An example of a wind turbine platform is illustrated in FIG. 3. As illustrated in FIG. 3, a wind turbine platform 200 includes a wind turbine base 220 and a plurality of radial moment beams 240. The plurality of radial moment beams 240 may extend radially from the wind turbine base 220. The wind turbine base 220 includes a plurality of base to turbine interfaces 222. The wind turbine platform 200 of FIG. 3 can be installed without the need of a large concrete pad (foundation) and/or a large excavation project to dig the hole for large concrete pad (foundation), as illustrated in FIGS. 1 and 2, by driving piles directly into the underlying medium (soil).

Figure 4:
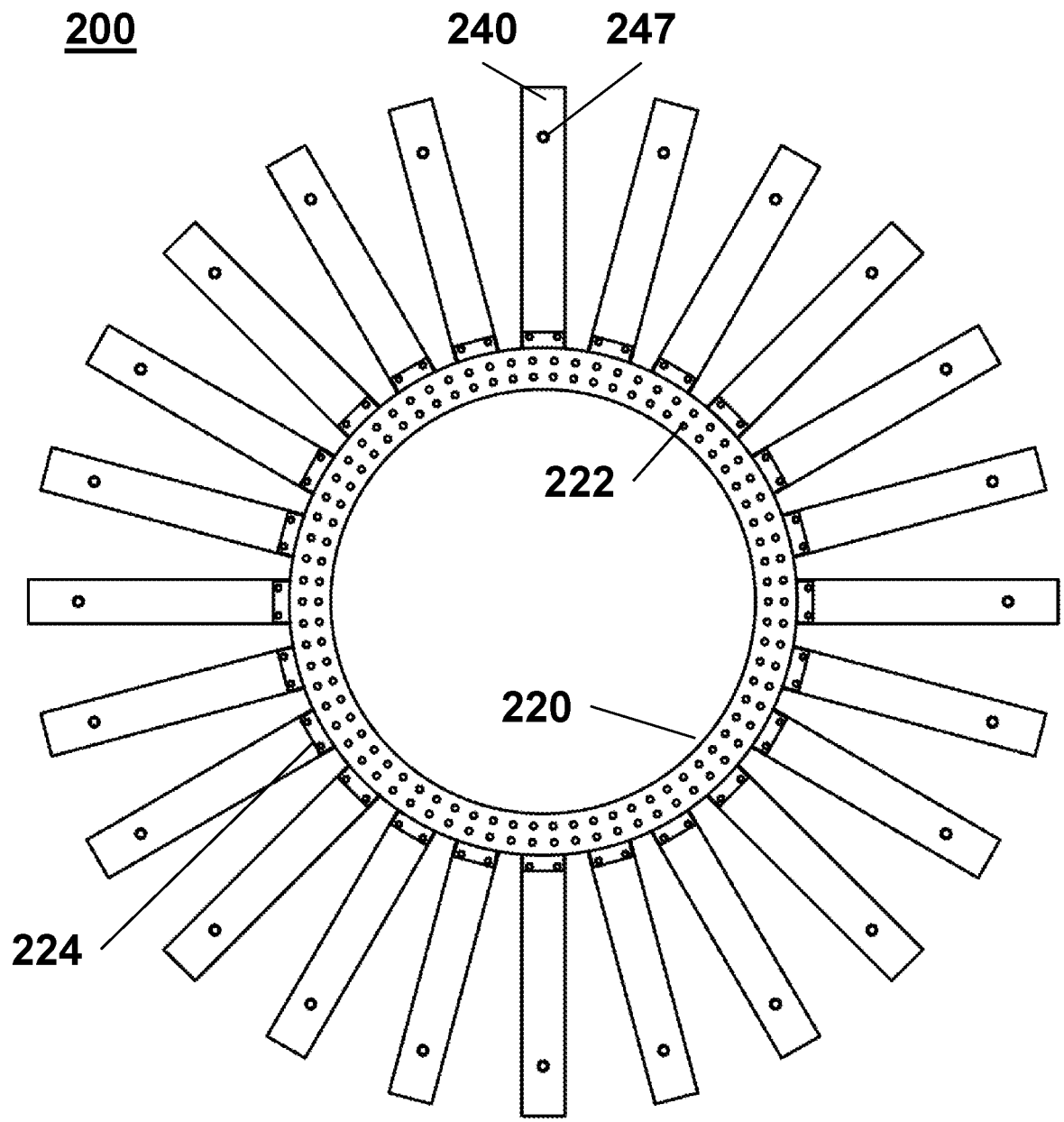
FIG. 4 illustrates a top view of the wind turbine platform of FIG. 3.

FIG. 4 is a top view of the wind turbine platform of FIG. 3. As illustrated in FIG. 4, a wind turbine platform 200 includes a wind turbine base 220 and a plurality of radial moment beams 240. The plurality of radial moment beams 240 may extend radially from the wind turbine base 220. The wind turbine base 220 includes a plurality of base to turbine interfaces 222 and a plurality of base to beam interfaces 224.

The plurality of radial moment beams 240 are attached to the wind turbine base 220 at base to beam interfaces 224. Each radial moment beam has a corresponding beam to base interface (not shown).

The base to beam interface 224 and the corresponding beam to base interface may be through holes for receiving a bolt or rivet (not shown) to attach the radial moment beam 240 to the wind turbine base 220 at the interfaces.

Alternatively, the base to beam interface 224 may be a through hole and the beam to base interface may be an integrated bolt or rivet, wherein the base to beam interface 222 is configured to receive the radial moment beam integrated bolt or rivet to attach the radial moment beam 240 to the wind turbine base 220 at the interfaces.

Also, the beam to base interface may be a through hole and the base to beam interface 224 may be an integrated bolt or rivet, wherein the beam to base interface is configured to receive the base to beam interface 224 to attach the radial moment beam 240 to the wind turbine base 220 at the interfaces.

Each radial moment beam 240 includes a beam to pile interface 247. Each pile (not shown) has a corresponding pile to beam interface (not shown).

The beam to pile interface 247 and the corresponding pile to beam interface may be through holes for receiving a bolt or rivet (not shown) to attach the radial moment beam 240 to a pile (not shown), which has been driven into the surrounding (underlying) medium (such as soil), at the interfaces.

Alternatively, the beam to pile interface 247 may be a through hole and the pile to beam interface may be an integrated bolt or rivet, wherein the beam to pile interface 247 is configured to receive the pile integrated bolt or rivet to attach the radial moment beam 240 to the pile at the interfaces.

Also, the beam to pile interface may be a through hole and the beam to pile interface 247 may be an integrated bolt or rivet, wherein the beam to pile interface is configured to receive the beam to pile interface 247 to attach the radial moment beam 240 to the pile at the interfaces.

The wind turbine platform 200 of FIG. 4 can be installed without the need of a large concrete pad (foundation) and/or a large excavation project to dig the hole for large concrete pad (foundation), as illustrated in FIGS. 1 and 2, by driving piles directly into the underlying medium (soil).

Figure 5:
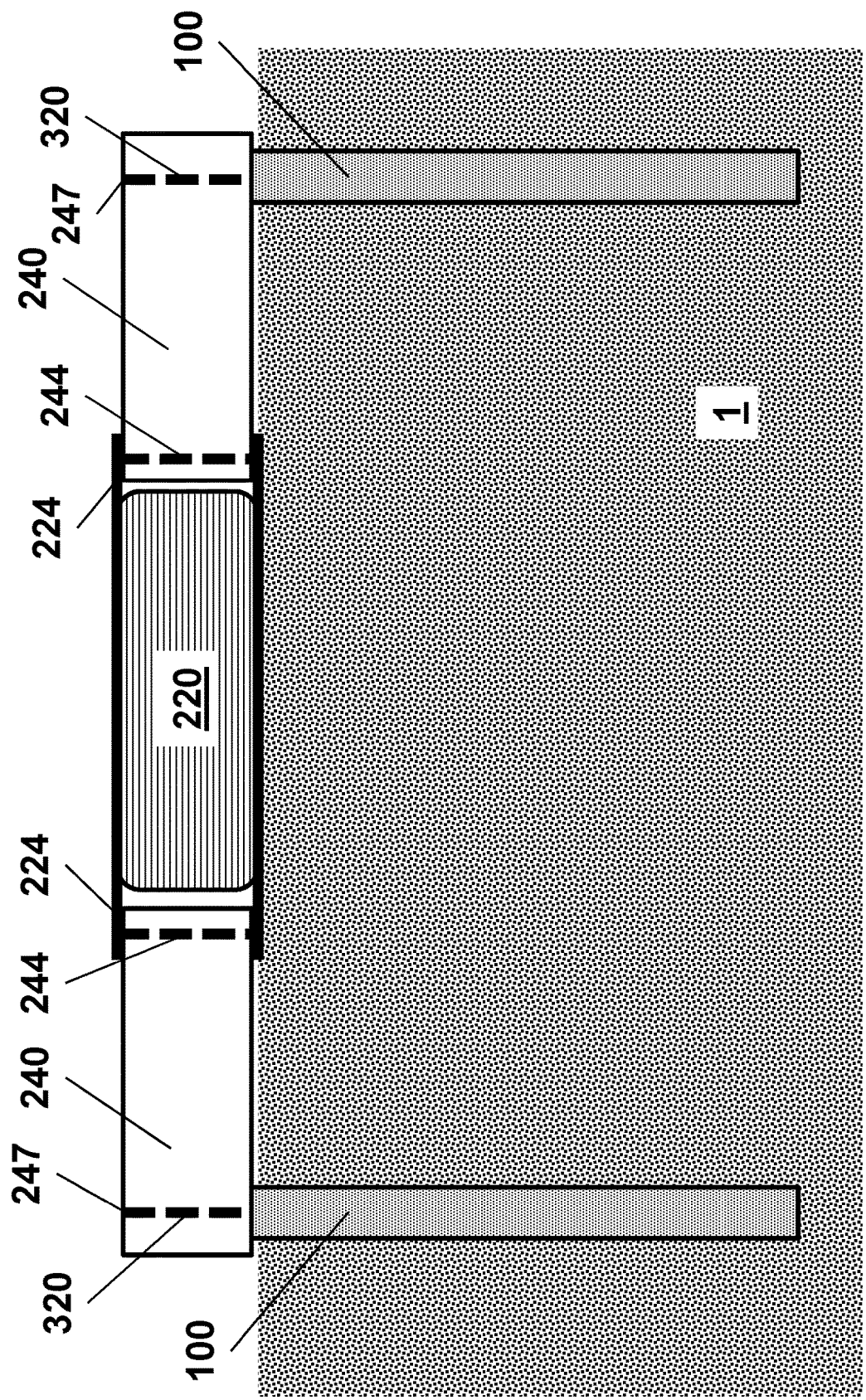
FIG. 5 illustrates the wind turbine platform of FIG. 3 installed using piles to secure the wind turbine platform in place.

FIG. 5 illustrates the wind turbine platform of FIG. 3 installed using piles to secure the wind turbine platform in place. As illustrated in FIG. 5, a wind turbine platform includes a wind turbine base 220 and a plurality of radial moment beams 240. The plurality of radial moment beams 240 may extend radially from the wind turbine base 220. The wind turbine base 220 includes a plurality of base to beam interfaces 224.

The plurality of radial moment beams 240 are attached to the wind turbine base 220 at base to beam interfaces 224. Each radial moment beam has a corresponding beam to base interface 244.

The base to beam interface 224 and the corresponding beam to base interface 244 may be through holes for receiving a bolt or rivet (not shown) to attach the radial moment beam 240 to the wind turbine base 220 at the interfaces.

Alternatively, the base to beam interface 224 may be a through hole and the beam to base interface 244 may be an integrated bolt or rivet, wherein the base to beam interface 222 is configured to receive the radial moment beam integrated bolt or rivet (beam to base interface 244) to attach the radial moment beam 240 to the wind turbine base 220 at the interfaces.

Also, the beam to base interface 244 may be a through hole and the base to beam interface 224 may be an integrated bolt or rivet, wherein the beam to base interface is configured to receive the base to beam interface 224 to attach the radial moment beam 240 to the wind turbine base 220 at the interfaces.

As illustrated in FIG. 5, the wind turbine platform is anchored to an underlying medium (soil) 1 via piles 100. Each radial moment beam 240 includes a beam to pile interface 247. Each pile 100 has a corresponding pile to beam interface 320. Each pile 100 is driven into the surrounding (underlying) medium (soil) 1. Each pile 100 may act as an anchor for the wind turbine platform, preventing that end of the wind turbine platform from pulling away from the medium (soil), when a wind is in a certain direction or may act as compression for the wind turbine platform, preventing that end of the wind turbine platform from pushing into the medium (soil), when a wind is in a certain opposite direction.

The beam to pile interface 247 and the corresponding pile to beam interface 320 may be through holes for receiving a bolt or rivet (not shown) to attach the radial moment beam 240 to the pile 100 at the interfaces.

Alternatively, the beam to pile interface 247 may be a through hole and the pile to beam interface 320 may be an integrated bolt or rivet, wherein the beam to pile interface 247 is configured to receive the pile integrated bolt or rivet (pile to beam interface 320) to attach the radial moment beam 240 to the pile 100 at the interfaces.

Also, the pile to beam interface 320 may be a through hole and the beam to pile interface 247 may be an integrated bolt or rivet, wherein the pile to beam interface 320 is configured to receive the beam to pile interface 247 to attach the radial moment beam 240 to the pile 100 at the interfaces.

As illustrated in FIG. 5, the wind turbine platform of FIG. 5 can be installed without the need of a large concrete pad (foundation) and/or a large excavation project to dig the hole for large concrete pad (foundation), as illustrated in FIGS. 1 and 2, by driving piles 100 directly into the underlying medium (soil).

Figure 6:
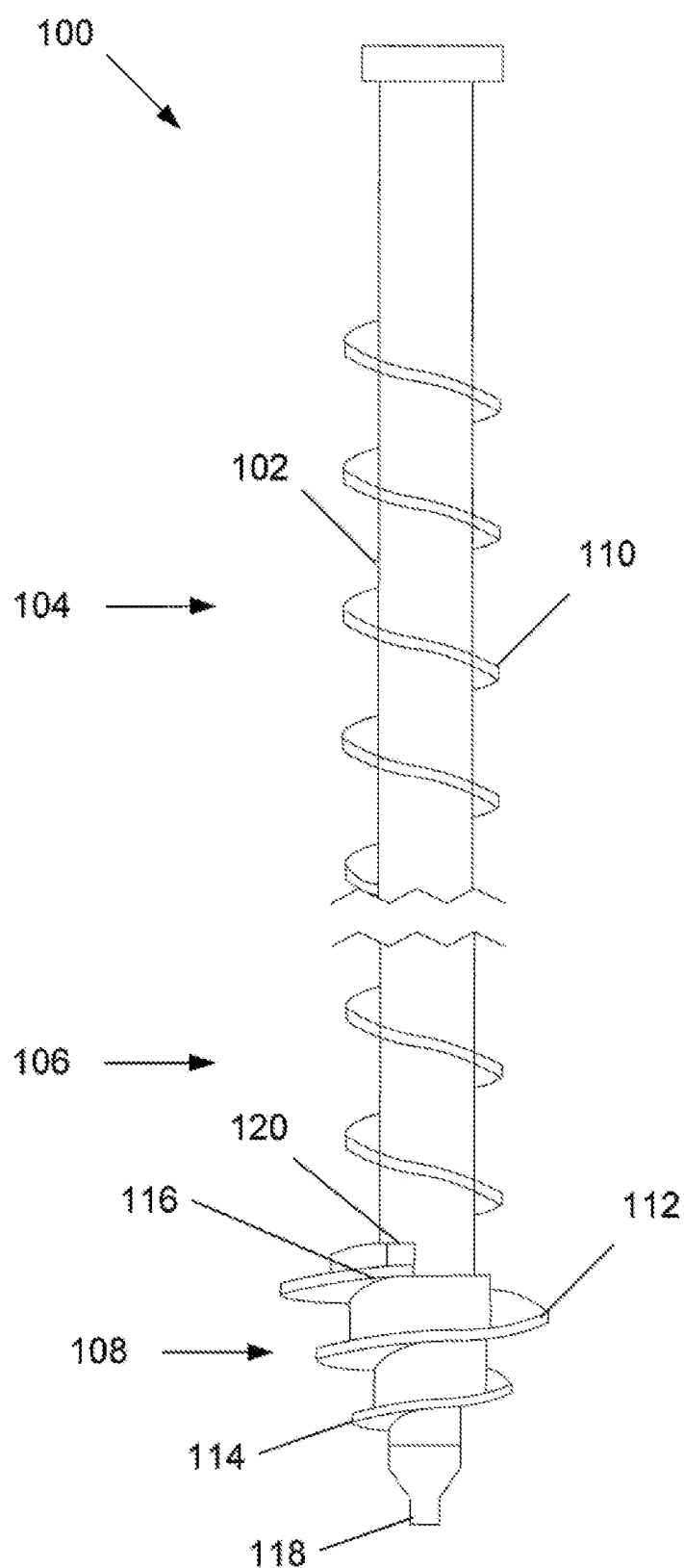
FIG. 6 illustrates an example of a piling.

FIG. 6 illustrates an example of a piling. As illustrated in FIG. 6, an auger grouted displacement pile 100 includes an elongated, tubular pipe 102 with a hollow central chamber, a top section 104 and a bottom section 106. Bottom section 106 includes a soil (medium) displacement head 108. Top section 104 includes a reverse auger 110. Soil (medium) displacement head 108 has a cutting blade 112 that has a leading edge 114 and a trailing edge 116.

The leading edge 114 of cutting blade 112 cuts into the soil (medium) as the pile is rotated and loosens the soil (medium) at such contact point. The soil (medium) displacement head 108 may be equipped with a point 118 to promote this cutting.

The loosened soil (medium) passes over cutting blade 112 and thereafter past trailing edge 116. The uppermost portion of cutting blade 112 includes a deformation structure 120 that displaces the soil (medium) as the cutting blade 112 cuts into the soil (medium) to create an annulus.

The leading edge 114 of cutting blade 112 cuts into the soil (medium) as the deformed displacement pile 100 is rotated and loosens the soil (medium) at such contact point. The soil (medium) displacement head 108 may be equipped with a point 118 to promote this cutting.

The loosened soil (medium) passes over cutting blade 112 and thereafter past trailing edge 116. As the loosened soil medium passes over cutting blade 112 and thereafter past trailing edge 116, the soil (medium) is laterally compacted by lateral compaction elements. The lateral compaction elements create an annulus having outer wall and void.

The uppermost portion of cutting blade 112 may include a deformation structure 120 that displaces the soil (medium) as the cutting blade 112 cuts into the outer wall of the annulus to create a spiral groove in the outer wall of the annulus.

After the displacement pile 100 is driven into position, grout (not shown) is introduced into the void of the annulus. The grout can be introduced by means of gravity or pressure into the void of the annulus.

Additionally, since the displacement pile 100 is a hollow tube, the grout can be introduced into the void of the annulus through the hollow tube by means of gravity or pressure, wherein the displacement pile 100 would include openings (not shown) that allows the grout to leave the pile and enter into the void of the annulus.

Other examples of displacement piles are disclosed in Published US Patent Application Number 2020/0190762, Published US Patent Application Number 2022/00042267, and co-pending U.S. patent application Ser. No. 17/528,642. The entire contents of Published US Patent Application Number 2020/0190762 and Published US Patent Application Number 2022/00042267 are hereby incorporated by reference. The entire content of U.S. patent application Ser. No. 17/528,642 is hereby incorporated by reference.

Figure 7:
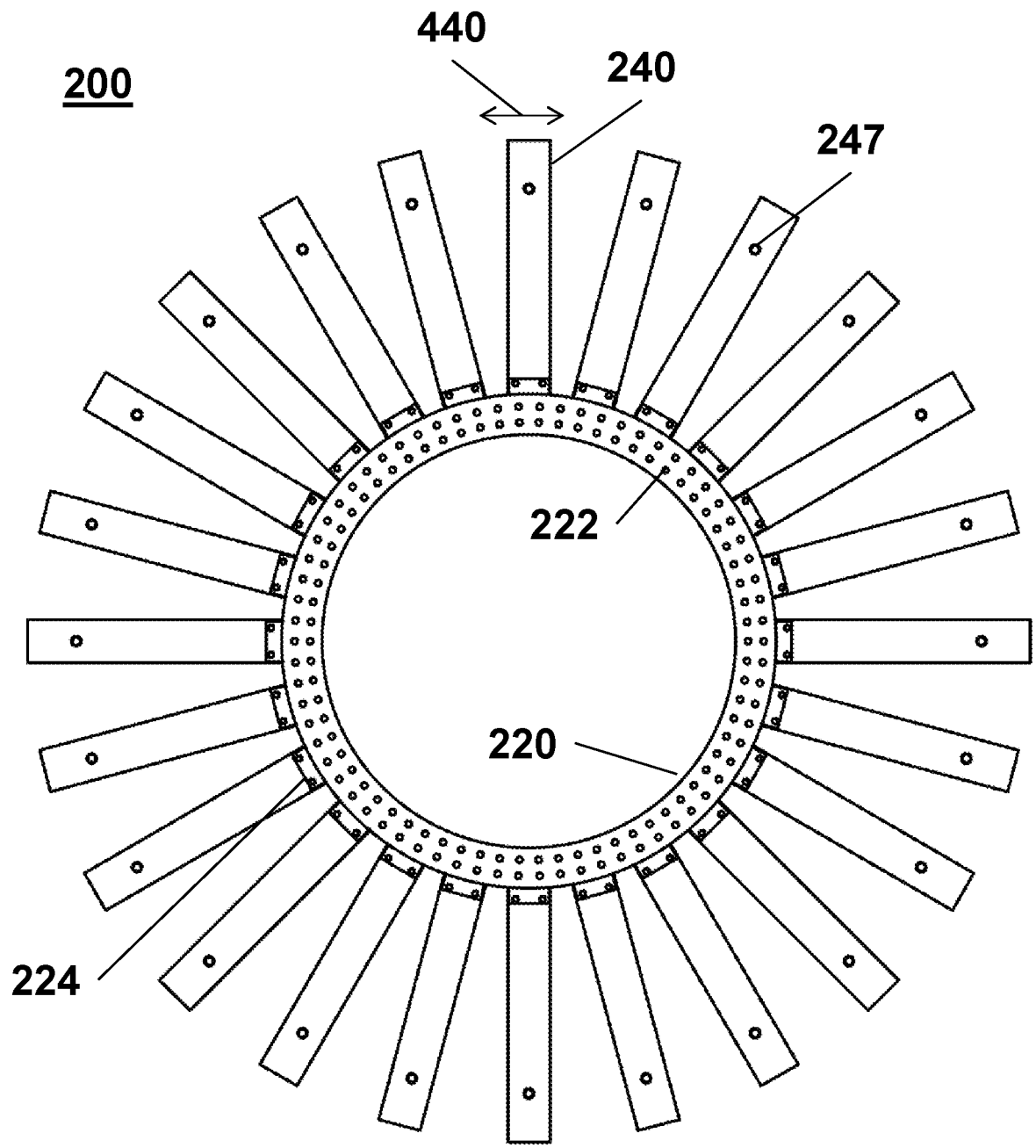
FIG. 7 a wind turbine platform and a plurality of radial moment beams.

FIG. 7 illustrates the wind turbine platform of FIG. 3. As illustrated in FIG. 7, a wind turbine platform 200 includes a wind turbine base 220 and a plurality of radial moment beams 240. The plurality of radial moment beams 240 may extend radially from the wind turbine base 220. The wind turbine base 220 includes a plurality of base to beam interfaces 224.

The plurality of radial moment beams 240 are attached to the wind turbine base 220 at base to beam interfaces 224. Each radial moment beam has a corresponding beam to base interface.

As illustrated in FIG. 7, the plurality of radial moment beams 240 can be moved horizontally 440 to enable the attachment of the radial moment beam 240 to a pile. The horizontal movement flexibility of the radial moment beam 240 provides tolerance to enable a proper attachment of the radial moment beam 240 to a pile.

The wind turbine platform 200 of FIG. 7 can be installed without the need of a large concrete pad (foundation) and/or a large excavation project to dig the hole for large concrete pad (foundation), as illustrated in FIGS. 1 and 2, by driving piles directly into the underlying medium (soil).

Figure 8:
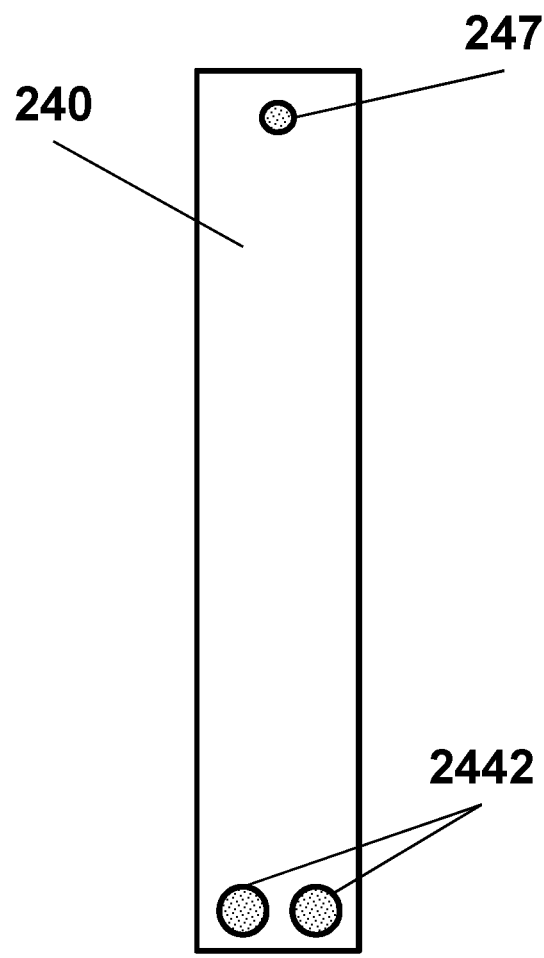
FIG. 8 illustrates an example of a radial moment beam.

FIG. 8 illustrates an example of radial moment beam with horizontal movement flexibility. As illustrated in FIG. 8, a radial moment beam 240 includes a pair of beam to base interfaces 2442. The pair of beam to base interfaces 2442, as illustrated in FIG. 8, is a pair of through holes configured to receive bolts or rivets or ring integrated bolts or rivets.

The radial moment beam 240 includes a beam to pile interface 247. The pile (not shown) has a corresponding pile to beam interface (not shown).

The beam to pile interface 247 and the corresponding pile to beam interface (not shown) may be through holes for receiving a bolt or rivet (not shown) to attach the radial moment beam 240 to a pile (not shown) at the interfaces.

Alternatively, the beam to pile interface 247 may be a through hole and the pile to beam interface (not shown) may be an integrated bolt or rivet, wherein the beam to pile interface 247 is configured to receive the pile integrated bolt or rivet (pile to beam interface (not shown)) to attach the radial moment beam 240 to a pile (not shown) at the interfaces.

Also, the beam to pile interface (not shown) may be a through hole and the beam to pile interface 247 may be an integrated bolt or rivet, wherein the beam to pile interface (not shown) is configured to receive the beam to pile interface 247 to attach the radial moment beam 240 to a pile (not shown) at the interfaces.

To provide the horizontal movement flexibility, the beam to base interfaces 2442 are oversized; i.e., the diameters of the beam to base interfaces 2442 are greater than the diameters of the bolts or rivets or ring integrated bolts or rivets.

It is noted that if the base to beam interface is a through hole, the diameter of the base to beam interface may be greater than the diameters of the bolts or rivets or ring integrated bolts or rivets to provide the horizontal movement flexibility of the radial moment beam.

Figure 9:
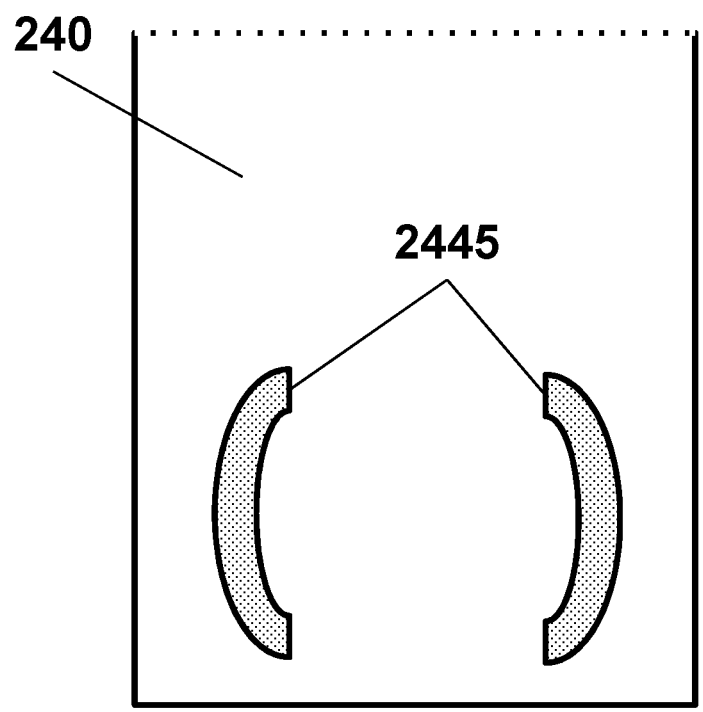
FIG. 9 illustrates another example of a radial moment beam.

FIG. 9 illustrates another example of radial moment beam with horizontal movement flexibility. As illustrated in FIG. 9, a radial moment beam 240 includes a pair of arc-shaped beam to base interfaces 2445. The pair of beam to base interfaces 2445, as illustrated in FIG. 9, is a pair of arc-shaped through holes configured to receive bolts or rivets or ring integrated bolts or rivets. To provide the horizontal movement flexibility, the arc shape of the beam to base interfaces 2445 provide a movement path for the received bolts or rivets or ring integrated bolts or rivets.

It is noted that if the base to beam interface is an arc-shaped through hole, the arc-shaped through hole of the base to beam interface may provide a movement path for the received bolts or rivets or ring integrated bolts or rivets to provide the horizontal movement flexibility of the radial moment beam.

Figure 10:
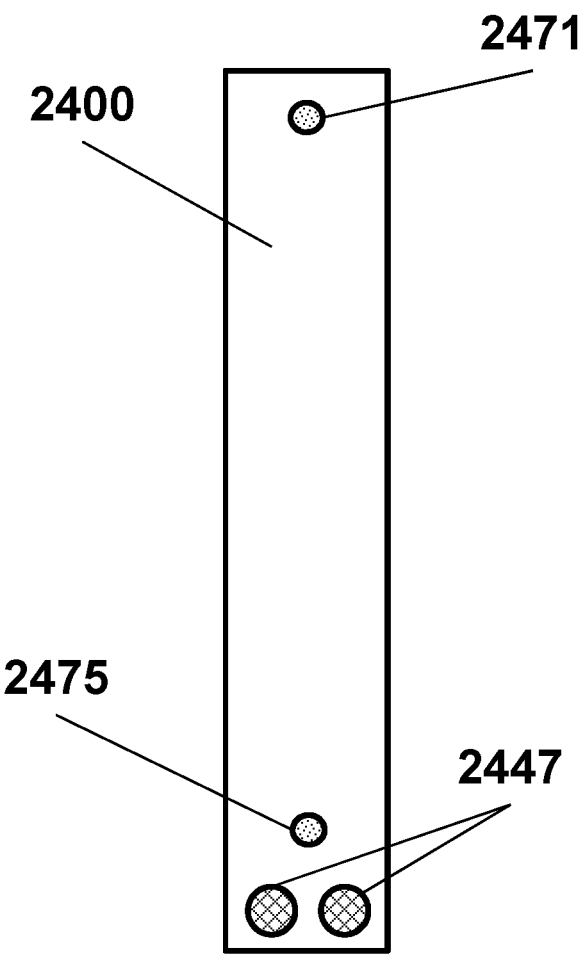
FIG. 10 illustrates another example of a radial moment beam.

FIG. 10 illustrates another example of radial moment beam with horizontal movement flexibility. As illustrated in FIG. 10, a radial moment beam 2400 includes a pair of beam to base interfaces 2447. The pair of beam to base interfaces 2447, as illustrated in FIG. 10, is a pair of through holes configured to receive bolts or rivets or ring integrated bolts or rivets.

The radial moment beam 2400 includes an outer beam to pile interface 2471 and an inner beam to pile interface 2475. The outer beam to pile interface 2471 is located at an end of the radial moment beam 2400 that is farthest from the wind turbine base. The inner beam to pile interface 2475 is located at an end of the radial moment beam 2400 that is closest to the wind turbine base. Each pile (not shown) connected to either the outer beam to pile interface 2471 or the inner beam to pile interface 2475 has a corresponding pile to beam interface (not shown).

The outer beam to pile interface 2471 and the corresponding pile to beam interface (not shown) may be through holes for receiving a bolt or rivet (not shown) to attach the radial moment beam 2400 to a pile (not shown) at the interfaces.

Alternatively, the outer beam to pile interface 2471 may be a through hole and the pile to beam interface (not shown) may be an integrated bolt or rivet, wherein the outer beam to pile interface 2471 is configured to receive the pile integrated bolt or rivet (pile to beam interface (not shown)) to attach the radial moment beam 2400 to a pile (not shown) at the interfaces.

Also, the pile to beam interface (not shown) may be a through hole and the outer beam to pile interface 2471 may be an integrated bolt or rivet, wherein the pile to beam interface (not shown) is configured to receive the outer beam to pile interface 2471 to attach the radial moment beam 240 to a pile (not shown) at the interfaces.

The inner beam to pile interface 2475 and the corresponding pile to beam interface (not shown) may be through holes for receiving a bolt or rivet (not shown) to attach the radial moment beam 240 to a pile (not shown) at the interfaces.

Alternatively, the inner beam to pile interface 2475 may be a through hole and the pile to beam interface (not shown) may be an integrated bolt or rivet, wherein the inner beam to pile interface 2475 is configured to receive the pile integrated bolt or rivet (pile to beam interface (not shown)) to attach the radial moment beam 240 to a pile (not shown) at the interfaces.

Also, the pile to beam interface (not shown) may be a through hole and the inner beam to pile interface 2475 may be an integrated bolt or rivet, wherein the pile to beam interface (not shown) is configured to receive the inner beam to pile interface 2475 to attach the radial moment beam 240 to a pile (not shown) at the interfaces.

To provide the horizontal movement flexibility, the beam to base interfaces 2447 may be oversized; i.e., the diameters of the beam to base interfaces 2447 are greater than the diameters of the bolts or rivets or ring integrated bolts or rivets.

It is noted that if the base to beam interface is a through hole, the diameter of the base to beam interface may be greater than the diameters of the bolts or rivets or ring integrated bolts or rivets to provide the horizontal movement flexibility of the radial moment beam.

Figure 11:
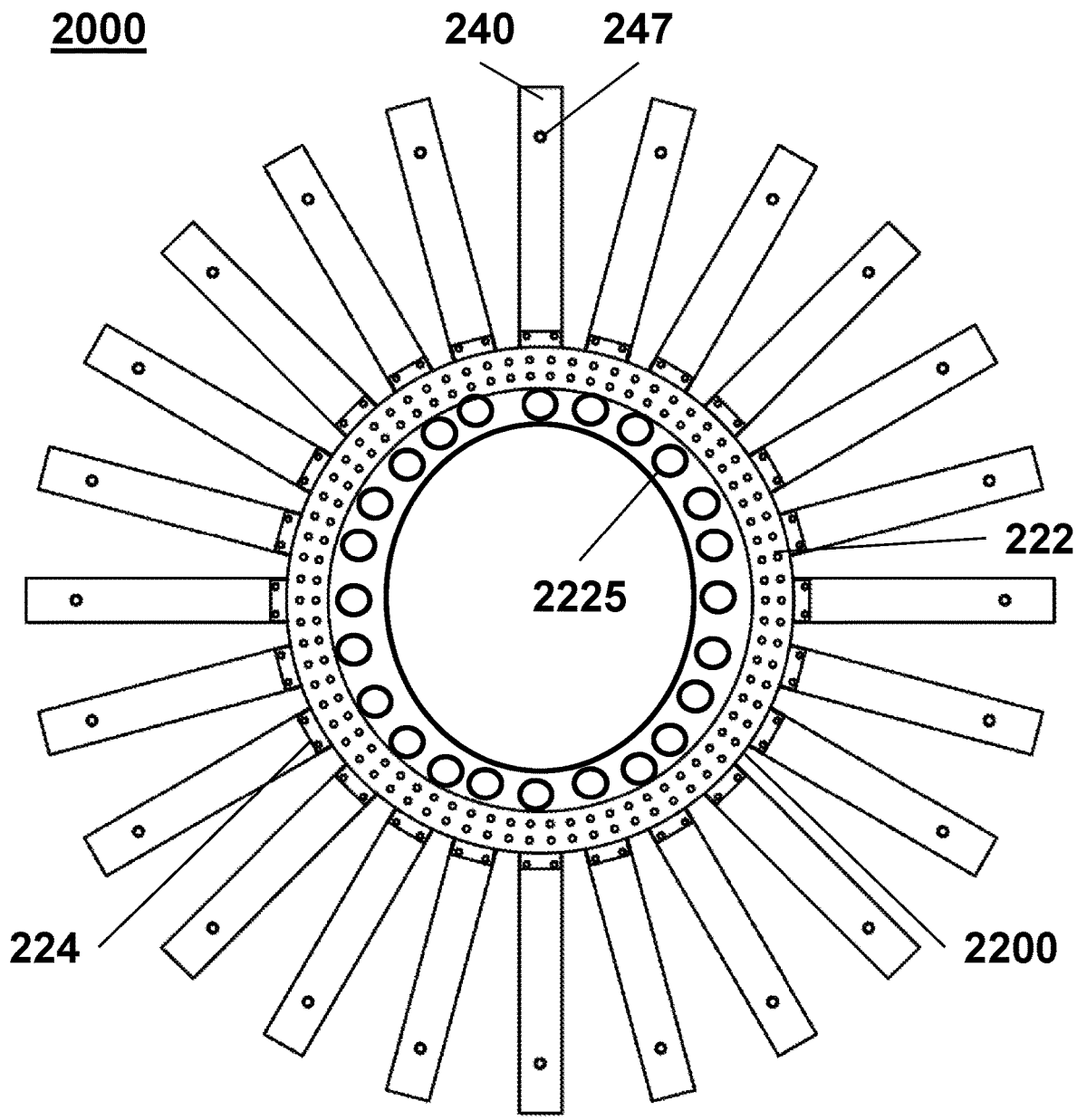
FIG. 11 illustrates a top view of another embodiment of a wind turbine base.

FIG. 11 is a top view of another embodiment of a wind turbine platform. As illustrated in FIG. 11, a wind turbine platform 2000 includes a wind turbine base 2200 and a plurality of radial moment beams 240. The plurality of radial moment beams 240 may extend radially from the wind turbine base 2200. The wind turbine base 2200 includes a plurality of base to turbine interfaces 222 and a plurality of base to beam interfaces 224.

The plurality of radial moment beams 240 are attached to the wind turbine base 2200 at base to beam interfaces 224. Each radial moment beam has a corresponding beam to base interface (not shown).

The base to beam interface 224 and the corresponding beam to base interface may be through holes for receiving a bolt or rivet (not shown) to attach the radial moment beam 240 to the wind turbine base 2200 at the interfaces.

Alternatively, the base to beam interface 224 may be a through hole and the beam to base interface may be an integrated bolt or rivet, wherein the base to beam interface 222 is configured to receive the radial moment beam integrated bolt or rivet to attach the radial moment beam 240 to the wind turbine base 2200 at the interfaces.

Also, the beam to base interface may be a through hole and the base to beam interface 224 may be an integrated bolt or rivet, wherein the beam to base interface is configured to receive the base to beam interface 224 to attach the radial moment beam 240 to the wind turbine base 2200 at the interfaces.

Each radial moment beam 240 includes a beam to pile interface 247. Each pile (not shown) has a corresponding pile to beam interface (not shown).

The beam to pile interface 247 and the corresponding pile to beam interface may be through holes for receiving a bolt or rivet (not shown) to attach the radial moment beam 240 to the pile, which has been driven into the surrounding medium (such as soil), at the interfaces.

Alternatively, the beam to pile interface 247 may be a through hole and the pile to beam interface may be an integrated bolt or rivet, wherein the beam to pile interface 247 is configured to receive the pile integrated bolt or rivet to attach the radial moment beam 240 to the pile at the interfaces.

Also, the pile to beam interface may be a through hole and the beam to pile interface 247 may be an integrated bolt or rivet, wherein the pile to beam interface is configured to receive the beam to pile interface 247 to attach the radial moment beam 240 to the pile at the interfaces.

The wind turbine base 2200 also includes a plurality of wind turbine base to pile interfaces 2225. The wind turbine base to pile interfaces 2225 may be located at an interior portion of the wind turbine base 2200, as illustrated in FIG. 11, or may be located at an exterior portion of the wind turbine base 2200.

Each pile (not shown) connected to a wind turbine base to pile interface 2225 has a corresponding pile to wind turbine base (not shown).

The wind turbine base to pile interface 2225 and the corresponding pile to wind turbine base (not shown) may be through holes for receiving a bolt or rivet (not shown) to attach the radial moment beam 240 to a pile (not shown) at the interfaces.

Alternatively, the wind turbine base to pile interface 2225 may be a through hole and the pile to wind turbine base (not shown) may be an integrated bolt or rivet, wherein the wind turbine base to pile interface 2225 is configured to receive the pile integrated bolt or rivet (pile to wind turbine base (not shown)) to attach the radial moment beam 240 to a pile (not shown) at the interfaces.

Also, the pile to wind turbine base (not shown) may be a through hole and the wind turbine base to pile interface 2225 may be an integrated bolt or rivet, wherein the pile to wind turbine base (not shown) is configured to receive the wind turbine base to pile interface 2225 to attach the radial moment beam 240 to a pile (not shown) at the interfaces.

The wind turbine platform 2000 of FIG. 10 can be installed without the need of a large concrete pad (foundation) and/or a large excavation project to dig the hole for large concrete pad (foundation), as illustrated in FIGS. 1 and 2, by driving piles directly into the underlying medium (soil).

FIG. 12 illustrates another embodiment of the wind turbine platform of FIG. 3 installed using piles to secure the wind turbine platform in place. As illustrated in FIG. 12, a wind turbine platform includes a wind turbine base 220 and a plurality of radial moment beams 240. The plurality of radial moment beams 240 may extend radially from the wind turbine base 220. The wind turbine base 220 includes a plurality of base to beam interfaces 224.

The plurality of radial moment beams 240 are attached to the wind turbine base 220 at base to beam interfaces 224. Each radial moment beam has a corresponding beam to base interface 244.

The base to beam interface 224 and the corresponding beam to base interface 244 may be through holes for receiving a bolt or rivet (not shown) to attach the radial moment beam 240 to the wind turbine base 220 at the interfaces.

Alternatively, the base to beam interface 224 may be a through hole and the beam to base interface 244 may be an integrated bolt or rivet, wherein the base to beam interface 222 is configured to receive the radial moment beam integrated bolt or rivet (beam to base interface 244) to attach the radial moment beam 240 to the wind turbine base 220 at the interfaces.

Also, the beam to base interface 244 may be a through hole and the base to beam interface 224 may be an integrated bolt or rivet, wherein the beam to base interface is configured to receive the base to beam interface 224 to attach the radial moment beam 240 to the wind turbine base 220 at the interfaces.

As illustrated in FIG. 12, the wind turbine platform is anchored to an underlying medium (soil) 1 via piles 100 and 110. Each radial moment beam 240 includes a beam to pile interface 247.

Each pile 100 has a corresponding pile to beam interface 320. Each pile 100 is driven into the surrounding (underlying) medium (soil) 1. Each pile 100 may act as an anchor for the wind turbine platform, preventing that end of the wind turbine platform from pulling away from the medium (soil), when a wind is in a certain direction or may act as compression for the wind turbine platform, preventing that end of the wind turbine platform from pushing into the medium (soil), when a wind is in a certain opposite direction.

Each pile 110 has a corresponding pile to beam interface (not shown). As illustrated in FIG. 12, each pile 110 may be attached at any location along a radial moment beam (as shown by the arrows) or attached to any location along the wind turbine base 220. Each pile 110 is driven into the surrounding (underlying) medium (soil) 1.

Moreover, each pile 110 may act as an anchor for the wind turbine platform, preventing that end of the wind turbine platform from pulling away from the medium (soil), when a wind is in a certain direction or may act as compression for the wind turbine platform, preventing that end of the wind turbine platform from pushing into the medium (soil), when a wind is in a certain opposite direction.

Also, each pile 110 may provide vertical support for the wind turbine.

The beam to pile interface 247 and the corresponding pile to beam interface 320 may be through holes for receiving a bolt or rivet (not shown) to attach the radial moment beam 240 to the pile 100 at the interfaces. With respect to the piles 110, the beam to pile interface and the corresponding pile to beam interface may be through holes for receiving a bolt or rivet (not shown) to attach the radial moment beam to the pile 110 at the interfaces Alternatively, the beam to pile interface 247 may be a through hole and the pile to beam interface 320 may be an integrated bolt or rivet, wherein the beam to pile interface 247 is configured to receive the pile integrated bolt or rivet (pile to beam interface 320) to attach the radial moment beam 240 to the pile 100 at the interfaces. With respect to the piles 110, the beam to pile interface may be a through hole and the pile to beam interface may be an integrated bolt or rivet, wherein the beam to pile interface is configured to receive the pile integrated bolt or rivet (pile to beam interface) to attach the radial moment beam to the pile 110 at the interfaces.

Also, the pile to beam interface 320 may be a through hole and the beam to pile interface 247 may be an integrated bolt or rivet, wherein the pile to beam interface 320 is configured to receive the beam to pile interface 247 to attach the radial moment beam 240 to the pile 100 at the interfaces. With respect to the piles 110, the pile to beam interface may be a through hole and the beam to pile interface may be an integrated bolt or rivet, wherein the pile to beam interface is configured to receive the beam to pile interface to attach the radial moment beam to the pile 110 at the interfaces.

As illustrated in FIG. 12, the wind turbine platform of FIG. 12 can be installed without the need of a large concrete pad (foundation) and/or a large excavation project to dig the hole for large concrete pad (foundation), as illustrated in FIGS. 1 and 2, by driving piles 100 directly into the underlying medium (soil).

It is noted that a radial moment beam may be connected to more than one pile or multiple piles.

Moreover, it is noted that a beam to pile interface may be connected to more than one pile or multiple piles.

Additionally, it is noted that wind turbine base to pile interface may be connected to more than one pile or multiple piles.

Although the various embodiments of the wind turbine base has been illustrated as being ring shape, the wind turbine base may be octagonal, hexagonal, pentagonal, or any shape to provide proper support for the wind turbine.

It is further noted that the piles may be attached to a radial moment beam and/or a wind turbine base via welding. More specifically, the piles may be welded to appropriate interfaces on a radial moment beam and/or a wind turbine base. In other words, the interfaces would be the locations on a pile, a radial moment beam and/or a wind turbine base where the weld is formed, A wind turbine platform comprises a wind turbine base; and a plurality of radial moment beams, operatively connected to the wind turbine base, extending radially from the wind turbine base, each radial moment beam may include a beam to pile interface configured to connectively engage a pile.

Each radial moment beam may include a beam to base interface configured to connectively engage the wind turbine base.

The wind turbine base may include a plurality of base to beam interfaces, each base to beam interface being configured to connectively engage a radial moment beam.

Each radial moment beam may include a pair of arc-shaped beam to base interfaces configured to provide each radial moment beam with horizontal movement flexibility.

The wind turbine base may include a plurality of base to turbine interfaces, each base to turbine interface being configured to connectively engage a tower for wind turbine.

Each radial moment beam may include a beam to base interface configured to connectively engage the wind turbine base; the beam to base interface being oversized to provide each radial moment beam with horizontal movement flexibility.

Each radial moment beam may include an outer beam to pile interface configured to connectively engage a pile and an inner beam to pile interface configured to connectively engage a pile; the outer beam to pile interface being located at an end of the radial moment beam that is farthest from the wind turbine base when the radial moment beam is connected to the wind turbine base; the inner beam to pile interface being located at an end of the radial moment beam that is closest to the wind turbine base when the radial moment beam is connected to the wind turbine base.

The wind turbine base may include a plurality of wind turbine base to pile interfaces, each wind turbine base to beam interface being configured to connectively engage a pile.

A wind turbine platform comprises a wind turbine base; a plurality of radial moment beams, operatively connected to the wind turbine base, extending radially from the wind turbine base; and a plurality of piles, each pile being operatively connected to a radial moment beam and extending into a medium to provide foundational support for the wind turbine platform.

Each radial moment beam may include a beam to pile interface configured to connectively engage one of the plurality of piles.

Each radial moment beam may include a beam to pile interface configured to connectively engage two piles Each radial moment beam may include a beam to base interface configured to connectively engage the wind turbine base.

The wind turbine base may include a plurality of base to beam interfaces, each base to beam interface being configured to connectively engage a radial moment beam.

Each radial moment beam may include a pair of arc-shaped beam to base interfaces configured to provide each radial moment beam with horizontal movement flexibility.

The wind turbine base may include a plurality of base to turbine interfaces, each base to turbine interface being configured to connectively engage a tower for wind turbine.

Each radial moment beam may include a beam to base interface configured to connectively engage the wind turbine base; the beam to base interface being oversized to provide each radial moment beam with horizontal movement flexibility.

Each pile may include a pile to beam interface configured to connectively engage a radial moment beam.

Each radial moment beam may include an outer beam to pile interface configured to connectively engage one of the plurality of piles and an inner beam to pile interface configured to connectively engage one of the plurality of piles; the outer beam to pile interface being located at an end of the radial moment beam that is farthest from the wind turbine base when the radial moment beam is connected to the wind turbine base; the inner beam to pile interface being located at an end of the radial moment beam that is closest to the wind turbine base when the radial moment beam is connected to the wind turbine base.

The wind turbine base may include a plurality of wind turbine base to pile interfaces, each wind turbine base to beam interface being configured to connectively engage one of the plurality of piles.

A wind turbine platform comprises a wind turbine base; a plurality of radial moment beams, operatively connected to the wind turbine base, extending radially from the wind turbine base; and a plurality of piles, each pile being operatively connected to a radial moment beam and extending into a medium to provide foundational support for the wind turbine platform; each radial moment beam including a beam to pile interface configured to connectively engage one of the plurality of piles; the wind turbine base including a plurality of wind turbine base to pile interfaces, each wind turbine base to beam interface being configured to connectively engage one of the plurality of piles.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A vertical structure support platform comprising:
a vertical structure support base; and
a plurality of radial moment beams, operatively connected to said vertical structure support base, extending radially from said vertical structure support base;
each radial moment beam including a beam to pile interface configured to connectively engage a first pile;
each radial moment beam integrally including a beam to base interface configured to connectively engage said vertical structure support base;
said beam to base interface being configured to provide each radial moment beam with horizontal movement flexibility;
said beam to base interface being configured as a pair of arc-shaped beam to base interfaces;
said pair of arc-shaped beam to base interfaces being configured to provide each radial moment beam with horizontal movement flexibility;
said pair of arc-shaped beam to base interfaces being configured to receive bolts or rivets;
said pair of arc-shaped beam to base interfaces being configured to provide an arc-shaped movement path for the received bolts or rivets.

2. The vertical structure support platform as claimed in claim 1, wherein said vertical structure support base includes a plurality of base to beam interfaces, each base to beam interface being configured to connectively engage one of said plurality of radial moment beams.

3. The vertical structure support platform as claimed in claim 1, wherein said vertical structure support base includes a plurality of base to vertical structure support interfaces, each base to vertical structure support interface being configured to connectively engage a vertical structure support.

4. The vertical structure support platform as claimed in claim 1, wherein each radial moment beam includes an inner beam to pile interface configured to connectively engage a second pile;
said beam to pile interface being located at an end of said radial moment beam that is farthest from said vertical structure support base when said radial moment beam is connected to said vertical structure support base;
said inner beam to pile interface being located at an end of said radial moment beam that is closest to said vertical structure support base when said radial moment beam is connected to said vertical structure support base.

5. The vertical structure support platform as claimed in claim 1, wherein said vertical structure support base includes a plurality of vertical structure support base to pile interfaces, each vertical structure support base to beam interface being configured to connectively engage a pile.

6. The vertical structure support platform as claimed in claim 1, wherein said pair of arc-shaped beam to base interfaces being configured to provide each radial moment beam with arc-shaped horizontal movement flexibility.

7. The vertical structure support platform as claimed in claim 1, wherein said vertical structure support base includes a plurality of base to beam interfaces, each base to beam interface being configured to connectively engage one of said plurality of radial moment beams.

8. The vertical structure support platform as claimed in claim 1, wherein said vertical structure support base includes a plurality of base to vertical structure support interfaces, each base to vertical structure support interface being configured to connectively engage a vertical structure support.

9. The vertical structure support platform as claimed in claim 1, wherein each radial moment beam includes an inner beam to pile interface configured to connectively engage a second pile;

said beam to pile interface being located at an end of said radial moment beam that is farthest from said vertical structure support base when said radial moment beam is connected to said vertical structure support base;

said inner beam to pile interface being located at an end of said radial moment beam that is closest to said vertical structure support base when said radial moment beam is connected to said vertical structure support base.

10. The vertical structure support platform as claimed in claim 1, wherein said vertical structure support base includes a plurality of vertical structure support base to pile interfaces, each vertical structure support base to pile interface being configured to connectively engage a pile.

\* \* \* \* \*